US010511618B2

(12) United States Patent
Sato et al.

(10) Patent No.: US 10,511,618 B2
(45) Date of Patent: Dec. 17, 2019

(54) WEBSITE INFORMATION EXTRACTION DEVICE, SYSTEM WEBSITE INFORMATION EXTRACTION METHOD, AND WEBSITE INFORMATION EXTRACTION PROGRAM

(71) Applicant: NIPPON TELEGRAPH AND TELEPHONE CORPORATION, Chiyoda-ku (JP)

(72) Inventors: Tohru Sato, Musashino (JP); Kazunori Kamiya, Musashino (JP); Takeshi Yagi, Musashino (JP); Kensuke Nakata, Musashino (JP); Daiki Chiba, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 0 days.

(21) Appl. No.: 15/121,822

(22) PCT Filed: Mar. 17, 2015

(86) PCT No.: PCT/JP2015/057875
§ 371 (c)(1),
(2) Date: Aug. 26, 2016

(87) PCT Pub. No.: WO2015/141665
PCT Pub. Date: Sep. 24, 2015

(65) Prior Publication Data
US 2017/0070520 A1 Mar. 9, 2017

(30) Foreign Application Priority Data
Mar. 19, 2014 (JP) .................................. 2014-056661

(51) Int. Cl.
*H04L 29/06* (2006.01)
*H04L 29/08* (2006.01)
*H04W 12/06* (2009.01)

(52) U.S. Cl.
CPC .......... *H04L 63/1425* (2013.01); *H04L 67/02* (2013.01); *H04W 12/06* (2013.01); *G06F 2221/2119* (2013.01)

(58) Field of Classification Search
CPC ............ H04L 63/1425; H04L 12/6418; H04L 63/101; H04L 63/1408; H04L 67/02
(Continued)

(56) References Cited

U.S. PATENT DOCUMENTS 8,239,668 B1 * 8/2012 Chen ................... H04L 63/1408
706/45
8,595,843 B1 11/2013 McCabe et al.
(Continued)

FOREIGN PATENT DOCUMENTS

CN 102546618 A 7/2012
CN 103428186 A 12/2013
(Continued)

OTHER PUBLICATIONS

Akiyama, "Searching structural neighborhood of malicious URLs to improve blacklisting", 2011, IEEE, pp. 1-10 (Year: 2011).*
(Continued)

*Primary Examiner* — Kenneth W Chang
*Assistant Examiner* — Gregory A Lane
(74) *Attorney, Agent, or Firm* — Oblon, McClelland, Maier & Neustadt, L.L.P.

(57) ABSTRACT

A malicious URL candidate extraction device extracts, from an access log including URLs accessed from a managed network, a known malicious URL excluded access log obtained by excluding an access log to known malicious
(Continued)

URLs. The malicious URL candidate extraction device creates a minor URL list obtained by preferentially extracting, from URLs indicated in the known malicious URL excluded access log, URLs having a small number of times of access from the managed network. The malicious URL candidate extraction device also creates a popular URL excluded list obtained by preferentially excluding URLs having a large number of times of access from the managed network during a predetermined period of time. The malicious URL candidate extraction device outputs these lists as a malicious URL candidate list.

7 Claims, 11 Drawing Sheets

(58) Field of Classification Search
USPC .................................................. 726/22, 24
See application file for complete search history.

(56) References Cited

U.S. PATENT DOCUMENTS

| | | | |
|---|---|---|---|
| 9,130,976 | B1 | 9/2015 | McCabe et al. |
| 9,756,063 | B1* | 9/2017 | Chung ................ H04L 63/1425 |
| 2007/0016951 | A1* | 1/2007 | Piccard ................ G06F 21/552 |
| | | | 726/24 |
| 2007/0204345 | A1 | 8/2007 | Pereira et al. |
| 2008/0189254 | A1* | 8/2008 | Cancel ................ G06F 17/3089 |
| 2008/0189408 | A1* | 8/2008 | Cancel ................ G06Q 10/04 |
| | | | 709/224 |
| 2009/0138573 | A1* | 5/2009 | Campbell ............. G06F 21/554 |
| | | | 709/218 |
| 2012/0304287 | A1 | 11/2012 | Yu et al. |
| 2013/0086677 | A1* | 4/2013 | Ma ..................... H04L 63/1483 |
| | | | 726/22 |
| 2013/0212654 | A1* | 8/2013 | Dorfman ................ H04L 67/02 |
| | | | 726/5 |
| 2013/0212680 | A1 | 8/2013 | Winn et al. |
| 2014/0304774 | A1* | 10/2014 | Bejerasco ............... H04L 63/10 |
| | | | 726/3 |
| 2015/0007312 | A1 | 1/2015 | Pidathala et al. |
| 2017/0323102 | A1* | 11/2017 | Manadhata ............. G06F 21/57 |

FOREIGN PATENT DOCUMENTS

| | | |
|---|---|---|
| CN | 103455758 A | 12/2013 |
| CN | 103532944 A | 1/2014 |
| JP | 2011-86086 A | 4/2011 |
| JP | 2012-118713 A | 6/2012 |
| JP | 2013-191199 A | 9/2013 |
| WO | 01/33371 A1 | 5/2001 |
| WO | WO 2015/009411 A1 | 1/2015 |

OTHER PUBLICATIONS

Extended European Search Report dated Jun. 16, 2017 in Patent Application No. 15765115.9.
International Search Report dated Jun. 16, 2015 in PCT/JP2015/057875 filed Mar. 17, 2015.
Combined Chinese Office Action and Search Report dated Jun. 26, 2018 in Chinese Patent Application No. 201580013640.9 (with English translation and English translation of Category of Cited Documents), 16 pages.
Combined Chinese Office Action and Search Report dated Mar. 12, 2019 in Patent Application 201580013640.9 (with unedited computer generated English translation of the Office Action and English translation of category of cited documents), 28 pages.
Combined Office Action and Search Report dated Jun. 18. 2019 in 201580013640.9, 29 pages. (with unedited computer generated English translation and English translation of categories of cited documents).
Guoyao, H. "Hacker Attack and Defense for This" Computer Newspaper Electronic Audio Video Publishing House, 2013, 18 pages.

* cited by examiner

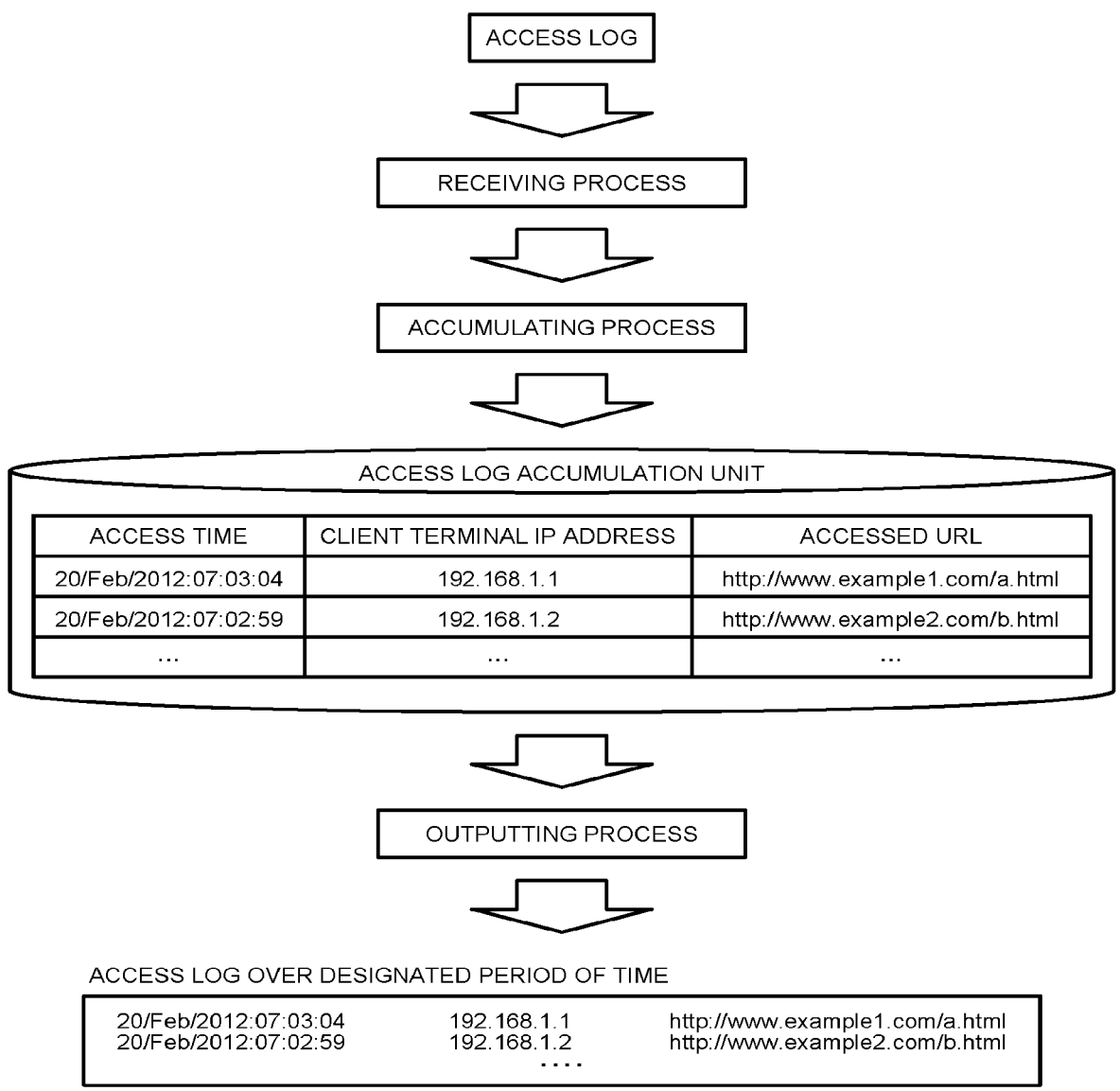

FIG.8

EXAMPLE OF KNOWN MALICIOUS URL EXCLUDED ACCESS LOG

| IP ADDRESS OF CLIENT TERMINAL | URL | |
|---|---|---|
| | FQDN COMPONENT | PATH COMPONENT |
| 192.168.1.1 | http://www.example1.com | / dir1 / file1.html |
| 192.168.1.2 | http://www.example1.com | / dir1 / file1.html |
| 192.168.1.3 | http://www.example1.com | / dir1 / file2.html |
| 192.168.1.4 | http://www.example2.com | / dir1 / file1.html |
| 192.168.1.5 | http://www.example2.com | / dir1 / file2.html |
| ⋮ | ⋮ | |

FIG.9

<CREATION OF MINOR URL LIST>

START

↓ S21

OBTAIN KNOWN MALICIOUS URL EXCLUDED ACCESS LOG

↓ S22

COUNT, FOR EACH URL, THE NUMBER OF CLIENT TERMINALS THAT ACCESS SAME URL

↓ S23

EXTRACT URLS IN ASCENDING ORDER OF THE NUMBER OF CLIENT TERMINALS THAT HAVE PERFORMED ACCESS THERETO

↓

END

FIG.10A

SUCH URLS THAT EVEN PATH COMPONENTS OF URLS COINCIDE ARE COUNTED AS SAME URL

|  | THE NUMBER OF ACCESSING CLIENT TERMINALS |
| --- | --- |
| http://www.example1.com / dir1 / file1.html | 2 |
| http://www.example1.com / dir1 / file2.html | 1 |
| http://www.example2.com / dir1 / file1.html | 1 |
| http://www.example2.com / dir1 / file2.html | 1 |
| ⋮ | ⋮ |

FIG.10B

SUCH URLS THAT FQDN COMPONENTS OF URLS COINCIDE ARE COUNTED AS SAME URL

|  | THE NUMBER OF ACCESSING CLIENT TERMINALS |
| --- | --- |
| http://www.example1.com | 3 |
| http://www.example2.com | 2 |
| ⋮ | ⋮ |

<CREATION OF UNIQUE POPULAR URL LIST>

<CREATION OF POPULAR URL EXCLUDED LIST>

WEBSITE INFORMATION EXTRACTION DEVICE, SYSTEM WEBSITE INFORMATION EXTRACTION METHOD, AND WEBSITE INFORMATION EXTRACTION PROGRAM

FIELD

The present invention relates to a website information extraction device, a system, a website information extraction method, and a website information extraction program.

BACKGROUND

Conventionally, there is a type of attack called a "targeted attack" that aims at a specific organization or a managed network thereof. With respect to the targeted attack, there have been reported many cases where in order to avoid countermeasures by a malicious uniform resource locator (URL) list that is open to the public, an attacker prepares a malicious URL that has not been registered in the list. As countermeasures against this targeted attack, an "organization-based malicious URL list" is required. In order to create the "organization-based malicious URL list", a malicious URL candidate list needs to be prepared for each organization and examined by a malicious URL examination system or the like.

CITATION LIST

Patent Literature

Patent Literature 1: Japanese Patent Application Laid-open No. 2012-118713

SUMMARY

Technical Problem

The number of URLs that can be examined by a malicious URL examination system is limited. An administrator or the like of the system, therefore, needs to narrow down the number of malicious URL candidates to some extent. Since a malicious URL candidate list generated by a conventional technique (for example, refer to Patent Literature 1) is based only on a malicious URL list that is open to the public, characteristics of each organization are not reflected. Therefore, a malicious URL that is used for a specific organization, such as through a targeted attack, might fail to undergo the examination by the malicious URL examination system.

In consideration of this, an object of the present invention is to solve the above-mentioned problem and extract a list of malicious URL candidates that are suspected to be malicious URLs in a specific organization.

Solution to Problem

To solve the problems described above and achieve the object, the present invention comprising: an access log accumulation unit that accumulates an access log including information of a website accessed from a managed network; a known malicious website excluding unit that extracts a known malicious website excluded access log obtained by excluding, from the access log, such an access log that a known malicious website is accessed; a malicious website candidate list creation unit that creates a minor website list obtained by extracting, from information of a website indicated in the known malicious website excluded access log, a predetermined number of items of information of a website in order of information of a website having a small number of times of access from the managed network; and an output unit that outputs the created minor website list.

Advantageous Effects of Invention

According to the present invention, it is possible to extract a list of malicious URL candidates that are suspected to be malicious URLs in a specific organization.

BRIEF DESCRIPTION OF DRAWINGS

FIG. 7 is a diagram conceptually illustrating a process ranging from reception to output of the access log.

FIG. 8 is a diagram illustrating an example of the known malicious URL excluded access log.

FIG. 9 is a flowchart illustrating a process for creating a minor URL list in S2 of FIG. 5.

FIG. 10A is a diagram illustrating an exemplary condition for considering that the same URL is accessed in a minor URL list creation unit.

FIG. 10B is a diagram illustrating an exemplary condition for considering that the same URL is accessed in the minor URL list creation unit.

DESCRIPTION OF EMBODIMENTS

Hereinafter, embodiments of the present invention (present embodiment) will be described with reference to the drawings. The present invention is not limited to the present embodiment. In the following description, an exemplary case where a uniform resource locator (URL) is used as information of a website (website information) accessed from a client terminal 20 (refer to FIG. 1) in a managed network of the present system will be described. However, the website information may be a fully qualified domain name (FQDN) or an Internet protocol (IP) address assigned to the FQDN.

Figure 1:
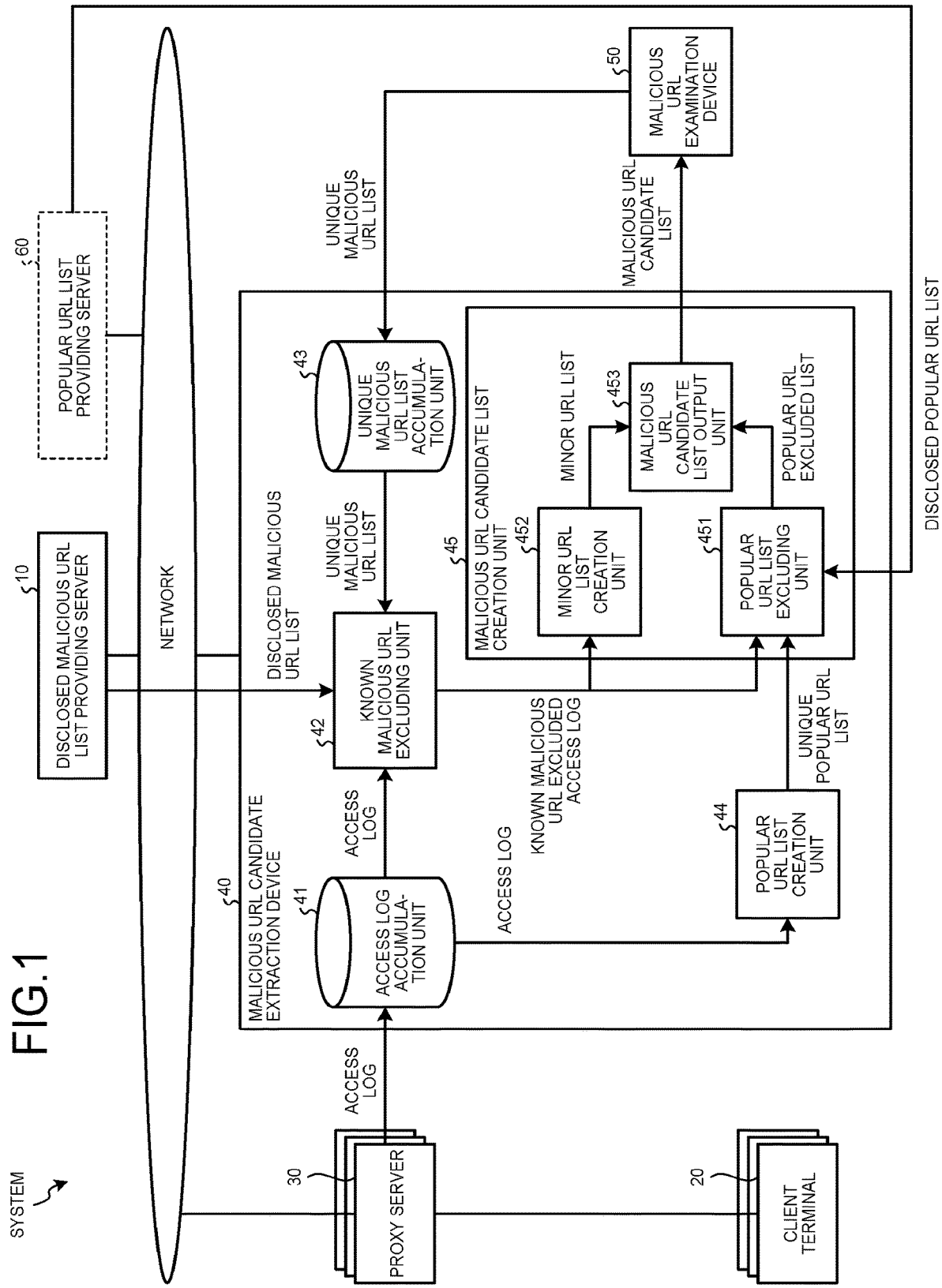
FIG. 1 is a diagram illustrating an exemplary configuration of a system.

The system of the present embodiment includes, as illustrated in FIG. 1, a disclosed malicious URL list providing server 10, the client terminal 20, a proxy server 30, a malicious URL candidate extraction device (website information extraction device) 40, and a malicious URL examination device 50. The system may include or may not include a popular URL list (popular website list) providing server 60 represented by a broken line. The system including the popular URL list (popular website list) providing server 60 will be described later. The number of respective servers, terminals, and devices is not limited to the number illustrated in FIG. 1.

Figure 2:
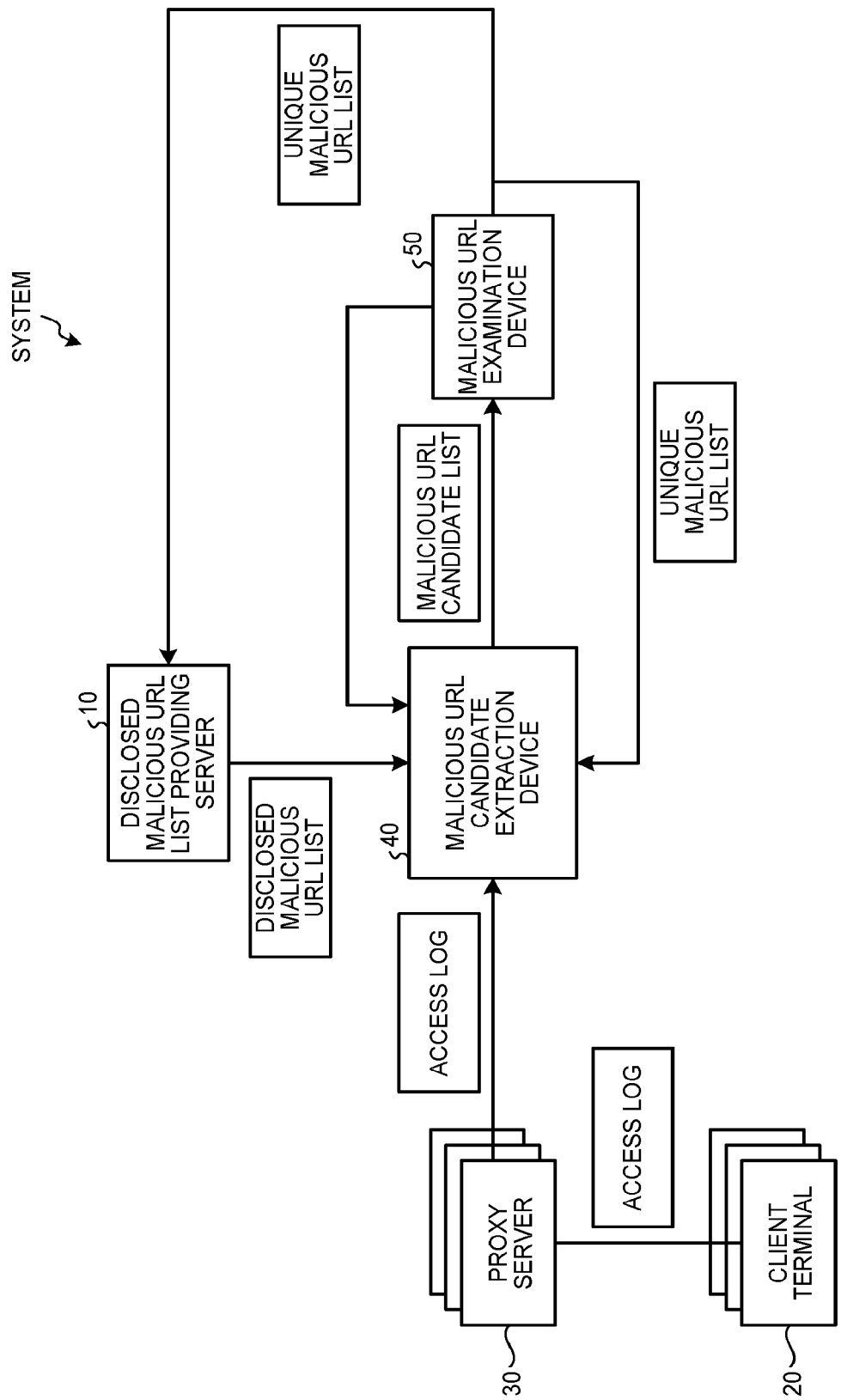
FIG. 2 is a diagram illustrating schematic information that is exchanged between servers, devices, and terminals in the system.

First, schematic information that is exchanged between the servers, the devices, and the terminals of the system will be described using FIG. 2.

The disclosed malicious URL list providing server 10 discloses, through a network such as the Internet, a list (malicious URL list) of URLs of websites that might be, for example, infected with malware. The malicious URL list is a list created by research institutes, researchers, experts, and companies related to information security or the like through their collection and investigation. Hereinafter, the malicious URL list provided by the disclosed malicious URL list providing server 10 is referred to as a disclosed malicious URL list.

The client terminal 20 is a terminal provided in the managed network of the present system. The client terminal 20, for example, is a personal computer or the like. The proxy server 30 relays access from the client terminal 20 to an external website, and records information (access log) indicating, for example, a URL of an accessed website, an access time, and an IP address of the client terminal 20.

The malicious URL candidate extraction device 40 creates, from URLs accessed from the client terminal 20 in the managed network, a malicious URL candidate list that might include a malicious URL by using the disclosed malicious URL list received from the disclosed malicious URL list providing server 10, the access log received from the proxy server 30, and a unique malicious URL list (unique malicious website list, to be described later). The malicious URL candidate extraction device 40 outputs the created malicious URL candidate list to the malicious URL examination device 50. Details of the malicious URL candidate extraction device 40 will be described later.

The malicious URL examination device 50 examines whether a URL indicated in the malicious URL candidate list is a malicious URL. The malicious URL examination device 50 may be realized by any of, for example, hardware, software, and web services provided on the Internet. An examination result of the malicious URL examination device 50 is sent to the malicious URL candidate extraction device 40 and the disclosed malicious URL list providing server 10 or the like. In a case where the examination result has been sent to the disclosed malicious URL list providing server 10, the malicious URL indicated in the examination result is added to the disclosed malicious URL list, and provided to other users as well.

Generally, whether the examination result of the malicious URL examination device 50 is to be sent to the disclosed malicious URL list providing server 10 or the like can be controlled by a setting or the like by a user of the malicious URL examination device 50. In a case where the examination result has not been sent to the disclosed malicious URL list providing server 10, it becomes a peculiar malicious URL list that is available only in an organization to which the user belongs. Hereinafter, the above-mentioned malicious URL list is referred to as the unique malicious URL list.

Next, a schematic process for outputting the malicious URL candidate list by the malicious URL candidate extraction device 40 will be described using FIG. 3. First, the malicious URL candidate extraction device 40 receives the access log of the client terminal 20 in the managed network. From the access log, the malicious URL candidate extraction device 40 excludes such an access log that URLs indicated in the disclosed malicious URL list and URLs indicated in the unique malicious URL list are accessed. The malicious URL candidate extraction device 40 then obtains a known malicious URL excluded access log (known malicious website excluded access log) (refer to sign 301 in FIG. 3).

After that, the malicious URL candidate extraction device 40 excludes, from URLs indicated in the known malicious URL excluded access log, URLs included in a list (unique popular URL list) obtained by extracting URLs in descending order of the number of times of access from the client terminal 20 in the managed network. A list of URLs obtained in this manner is referred to as a popular URL excluded list (popular website excluded list) (refer to sign 302 in FIG. 3).

Figure 3:
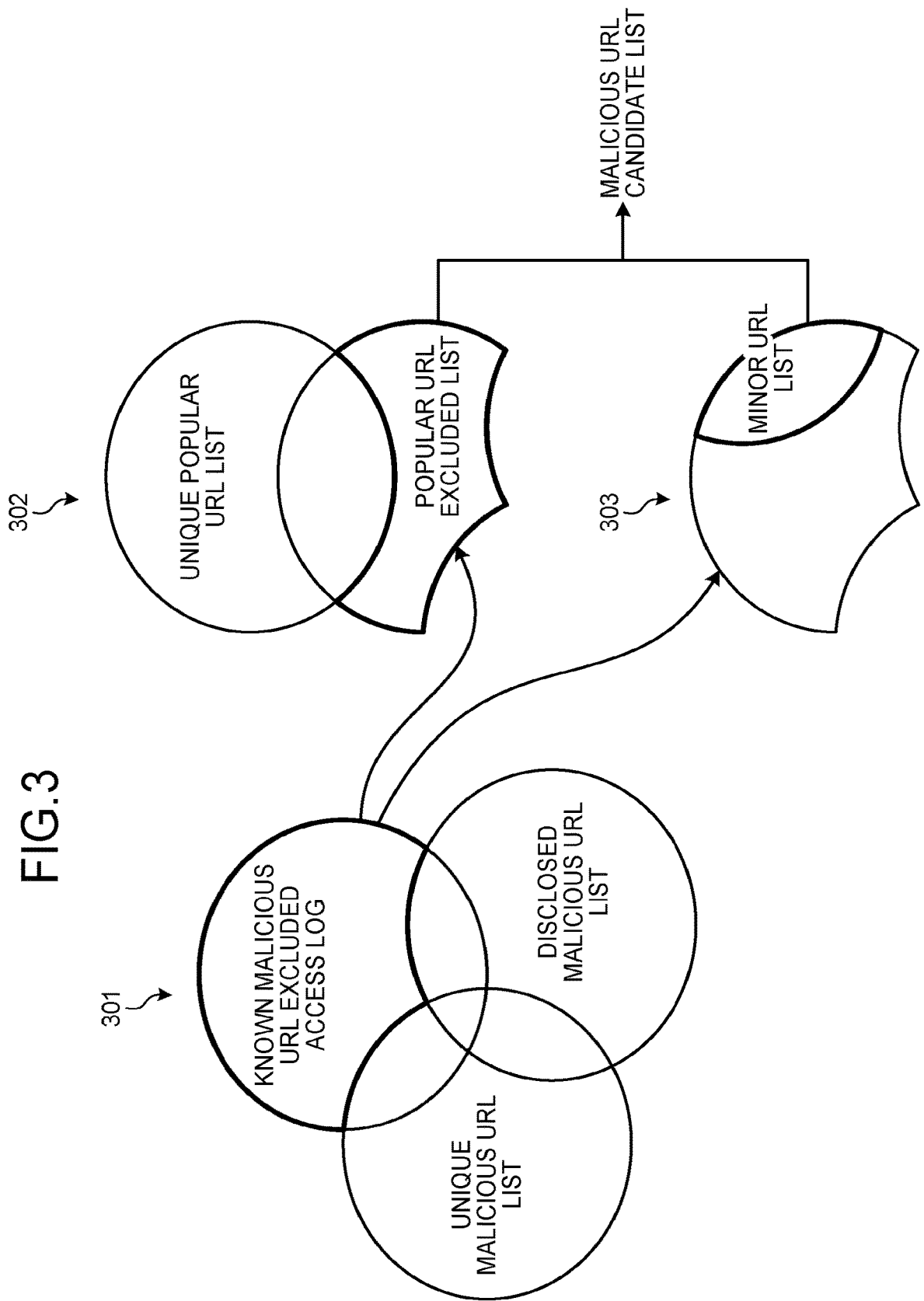
FIG. 3 is a diagram conceptually illustrating a process for creating a malicious URL candidate list by a malicious URL candidate extraction device in FIG. 1.

The malicious URL candidate extraction device 40 also creates a list (minor URL list) obtained by extracting, from the URLs indicated in the known malicious URL excluded access log, URLs in ascending order of the number of times of access from the client terminal 20 in the managed network (refer to sign 303 in FIG. 3).

The malicious URL candidate extraction device 40 then outputs the minor URL list (minor website list) and the popular URL excluded list as the malicious URL candidate list.

In other words, the malicious URL candidate extraction device 40 outputs, as the malicious URL candidate list, a URL group having a relatively low number of times of access during a predetermined period of time among the URLs accessed from the client terminal 20 in the managed network other than URLs which have already been known as malicious URLs. That is, since these URLs can be regarded as URLs that are relatively more secure than URLs having a small number of times of access, the malicious URL candidate extraction device 40 can exclude these URLs from the malicious URL candidate list. The malicious URL candidate extraction device 40 also excludes, from the malicious URL candidate list, URLs which have already been found to be malicious URLs. In other words, the malicious URL candidate extraction device 40 extracts, as the malicious URL candidate list, URLs which have not been known to be malicious URLs so far and have not been frequently accessed. In this manner, the malicious URL candidate extraction device 40 can extract, as the malicious URL candidate list, URLs which might be used for an attack on a specific organization such as a targeted attack.

As an access log that is used for creating the unique popular URL list in the malicious URL candidate extraction device 40, an access log over a certain period of time is preferably used.

Figure 4:
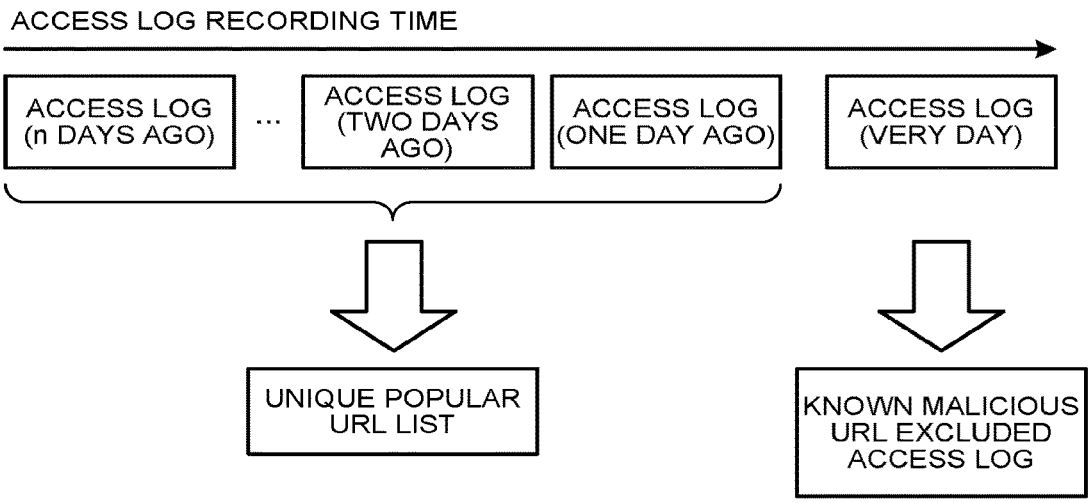
FIG. 4 is a diagram illustrating an exemplary period of time of an access log that is used for creating a unique popular URL list and a known malicious URL excluded access log.

For example, as illustrated in FIG. 4, when creating the known malicious URL excluded access log, the malicious URL candidate extraction device 40 uses an access log on the very day of the creation of the malicious URL candidate list. For the creation of the unique popular URL list, however, the malicious URL candidate extraction device 40 uses an access log over n days to one day prior to the day of the creation of the malicious URL candidate list. As mentioned above, since the malicious URL candidate extraction device 40 uses the access log over a certain period of time to create the unique popular URL list, it is possible to include, in the unique popular URL list, a URL of such a site as to have a low number of times of access temporarily but have a relatively large number of times of access when logged for a certain period of time.

Next, returning to FIG. 1, the malicious URL candidate extraction device 40 will be described in detail. The malicious URL candidate extraction device 40 includes an access log accumulation unit 41, a known malicious URL excluding unit (known malicious website excluding unit) 42, a unique malicious URL list accumulation unit (unique malicious website list accumulation unit) 43, a popular URL list creation unit (popular website list creation unit) 44, and a malicious URL candidate list creation unit (malicious website candidate list creation unit) 45.

The access log accumulation unit 41 accumulates the access log of the client terminal 20. Specifically, the access log accumulation unit 41 communicates with the proxy server 30 every predetermined period of time to receive the access log recorded in the proxy server 30. The access log accumulation unit 41 also outputs, in response to a request from the known malicious URL excluding unit 42, an access log during a designated period of time.

The known malicious URL excluding unit 42 extracts, from the access log, an access log (known malicious URL excluded access log) to URLs other than known malicious URLs. Specifically, the known malicious URL excluding unit 42 obtains the access log during the designated period of time (period of time for examination) from the access log accumulation unit 41. The disclosed malicious URL list is obtained from the disclosed malicious URL list providing server 10, and the unique malicious URL list is obtained from the unique malicious URL list accumulation unit 43. Then, the known malicious URL excluding unit 42 checks accessed URLs indicated in the obtained access log against URLs indicated in the known malicious URL lists (disclosed malicious URL list and unique malicious URL list). From the obtained access log, the known malicious URL excluding unit 42 extracts the known malicious URL excluded access log obtained by excluding such an access log that the URLs in the known malicious URL lists are accessed. The known malicious URL excluded access log does not include an access log to the known malicious URLs. In other words, an access log to unknown malicious URLs might be included.

The unique malicious URL list accumulation unit 43 accumulates the unique malicious URL list that is a list of URLs that have been determined to be malicious URLs by the examination in the malicious URL examination device 50.

The popular URL list creation unit 44 refers to the access log to create a list (unique popular URL list) of URLs having a relatively large number of times of access from the client terminal 20 in the managed network. Specifically, the popular URL list creation unit 44 performs a statistical process for URLs recorded in an access log during a predetermined period of time prior to the period of time for examination among the access log accumulated in the access log accumulation unit 41. The popular URL list creation unit 44 then creates a list (unique popular URL list) of URLs having a large number of times of access (or frequencies of access) from the client terminal 20 in the managed network. The statistical process in this context, for example, is a count of the number of times of access to the URL and the number of client terminals 20 that have accessed the URL or the like. Since the URL indicated in the unique popular URL list is a URL of a site having a large number of times of daily access from the managed network, it is considered to be a URL of a relatively reliable site.

The malicious URL candidate list creation unit 45 creates the malicious URL candidate list based on the known malicious URL excluded access log. The malicious URL candidate list creation unit 45 includes a popular URL list excluding unit 451, a minor URL list creation unit 452, and a malicious URL candidate list output unit 453.

The popular URL list excluding unit 451 creates a list (popular URL excluded list) of URLs obtained by excluding the URLs included in the unique popular URL list from the accessed URLs indicated in the known malicious URL excluded access log. Specifically, the popular URL list excluding unit 451 obtains the known malicious URL excluded access log from the known malicious URL excluding unit 42, and obtains the unique popular URL list from the popular URL list creation unit 44. The popular URL list excluding unit 451 then creates a list (popular URL excluded list) of URLs obtained by excluding the URLs included in the unique popular URL list from the URLs indicated in the obtained known malicious URL excluded access log. The popular URL list excluding unit 451 outputs the created popular URL excluded list to the malicious URL candidate list output unit 453. Since the URLs indicated in the popular URL excluded list are each a URL of a site that has not been revealed to be malicious in a previous examination and does not have a large number of times of daily access from the managed network, the URLs indicated in the popular URL excluded list might include unknown malicious URLs.

The minor URL list creation unit 452 performs a statistical process for the URLs recorded in the known malicious URL excluded access log to create a list (minor URL list) of URLs having a small number of times of access (or frequencies of access) from the client terminal 20 in the managed network. The minor URL list creation unit 452 outputs the created minor URL list to the malicious URL candidate list output unit 453. Since the URLs indicated in the minor URL list are each a URL of a site that has not been revealed to be malicious in a previous examination and has a small number of times of access from the managed network, the URLs indicated in the minor URL list might include unknown malicious URLs.

The malicious URL candidate list output unit 453 outputs the popular URL excluded list and the minor URL list as the malicious URL candidate list. The malicious URL candidate list, for example, is output to the malicious URL examination device 50. The malicious URL examination device 50 that has received the malicious URL candidate list examines the sites indicated in the malicious URL candidate list. When outputting the malicious URL candidate list, the malicious URL candidate list output unit 453 may convert the malicious URL candidate list into a file format that can be processed in the malicious URL examination device 50, and output the malicious URL candidate list.

(Processing Procedure)

Next, a processing procedure of the malicious URL candidate extraction device 40 will be described. First, a schematic process of the malicious URL candidate extraction device 40 will be described using FIG. 5.

(Schematic Process)

The malicious URL candidate extraction device 40 extracts the known malicious URL excluded access log from the access log accumulated in the access log accumulation unit 41 (S1). After that, the malicious URL candidate extraction device 40 creates the minor URL list from the known malicious URL excluded access log (S2). Specifically, the malicious URL candidate extraction device 40 creates the minor URL list by preferentially extracting, from the respective accessed URLs indicated in the known malicious URL excluded access log, URLs having a small number of times of access from the managed network. The malicious URL candidate extraction device 40 creates the unique popular URL list from the access log accumulated in the access log accumulation unit 41 (S3). Specifically, the malicious URL candidate extraction device 40 creates the unique popular URL list obtained by preferentially extracting, from the respective accessed URLs indicated in the access log, URLs having a large number of times of access from the managed network.

After that, the malicious URL candidate extraction device 40 creates the popular URL excluded list obtained by excluding the URLs in the unique popular URL list from the URLs indicated in the known malicious URL excluded access log (S4). The malicious URL candidate extraction device 40 then outputs the minor URL list and the popular URL excluded list as the malicious URL candidate list (S5).

In this manner, the malicious URL candidate extraction device 40 can output, as the malicious URL candidate list, a list of URLs, other than the known malicious URLs, of sites having a relatively low number of times of access from the client terminal 20 in the managed network.

The malicious URL candidate extraction device 40 may create the popular URL excluded list (S3, S4) after creating the minor URL list (S2). Alternatively, the malicious URL candidate extraction device 40 may create the minor URL list (S2) after creating the popular URL excluded list (S3, S4).

(Extraction of Known Malicious URL Excluded Access Log)

Figure 5:
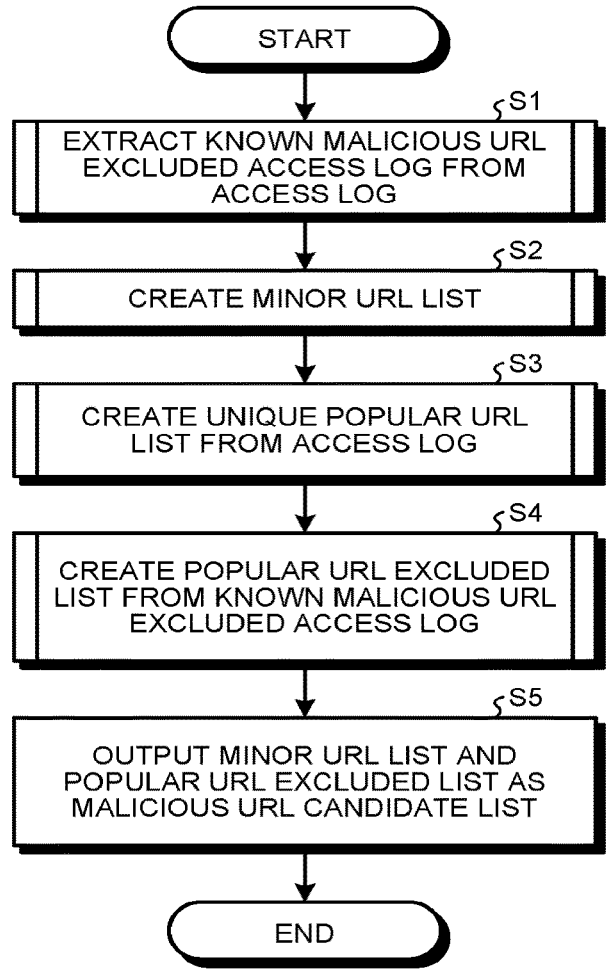
FIG. 5 is a flowchart illustrating a processing procedure of the malicious URL candidate extraction device.

Next, a process for extracting the known malicious URL excluded access log in S1 of FIG. 5 will be described in detail using FIG. 6. First, the access log accumulation unit 41 of the malicious URL candidate extraction device 40 receives the access log of the client terminal 20 in the managed network from the proxy server 30 (S11), and accumulates the received access log (S12). After that, the access log accumulation unit 41 outputs the access log over the designated period of time to the known malicious URL excluding unit 42 based on the request from the known malicious URL excluding unit 42 (S13).

For example, as illustrated in FIG. 7, the access log accumulation unit 41 performs a process for receiving the access log from the proxy server 30, and performs a process for accumulating the received access log. As a result, the access log including items such as an access time, a client terminal IP address, and an accessed URL is accumulated in a storage unit (not illustrated) of the access log accumulation unit 41. The access time is a time when the client terminal 20 accesses a site on the Internet via the proxy server 30. The client terminal IP address is an IP address of the client terminal 20. The accessed URL is a URL of a site on the Internet that the client terminal 20 has accessed via the proxy server 30. The access log accumulation unit 41 then performs a process for outputting the access log over the designated period of time based on the request from the known malicious URL excluding unit 42. The designated period of time in this context may be a period of time set in advance by the known malicious URL excluding unit 42, or may be a period of time designated by a user every time when the malicious URL candidate extraction device 40 is operated.

Regarding a method of receiving the access log by the access log accumulation unit 41, for example, the access log may be received from the proxy server 30 line by line by means of a log transfer means such as syslog every time when the client terminal 20 accesses an arbitrary site on the Internet. Alternatively, a file of a somewhat substantial number of access logs may be received from the proxy server 30 every predetermined period of time by means of a file transfer means such as a file transfer protocol (FTP) and a server message block (SMB).

Figure 6:
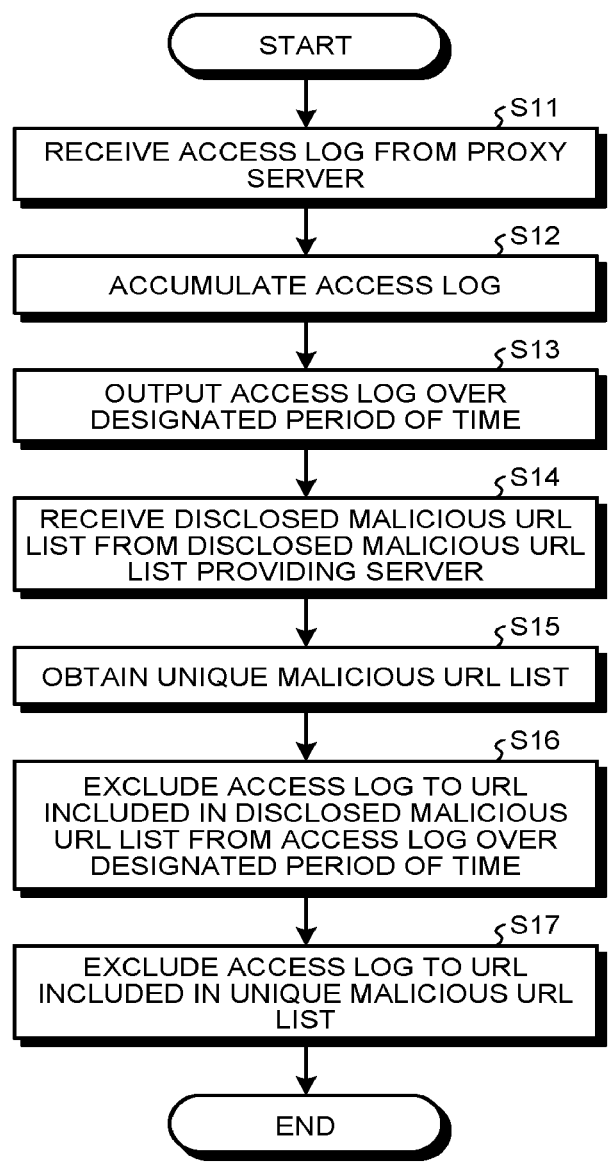
FIG. 6 is a flowchart illustrating a process for extracting the known malicious URL excluded access log in S1 of FIG. 5.

Returning to the explanation of FIG. 6, after S13, the known malicious URL excluding unit 42 receives the disclosed malicious URL list from the disclosed malicious URL list providing server 10 (S14). The known malicious URL excluding unit 42 also obtains the unique malicious URL list from the unique malicious URL list accumulation unit 43 (S15). After that, the access log to the URLs included in the disclosed malicious URL list is excluded from the access log over the designated period of time sent in S13 (S16), and the access log to the URLs included in the unique malicious URL list is excluded (S17). In this manner, the known malicious URL excluding unit 42 obtains the known malicious URL excluded access log.

The processes in S16 and S17 will be described in detail with reference to concrete examples. First, S16 will be described. The known malicious URL excluding unit 42 compares, for example, a value of a URL field in each line of the access log over the designated period of time output in S13 of FIG. 6 with the URL in the disclosed malicious URL list received in S14. When the URL in the disclosed malicious URL list coincides with the value of the URL field of the access log, the corresponding line of the access log held by the known malicious URL excluding unit 42 is discarded. On the other hand, when the URL in the disclosed malicious URL list does not coincide with the value of the URL field of the access log, the corresponding line of the access log held by the known malicious URL excluding unit 42 is recorded. The known malicious URL excluding unit 42 performs the above-mentioned process for all the lines of the access log over the designated period of time sent from the access log accumulation unit 41. The known malicious URL excluding unit 42 then extracts, from this access log, an access log obtained by excluding lines having the URLs in the disclosed malicious URL list.

Next, S17 will be described in detail. The known malicious URL excluding unit 42 compares the access log obtained by the process in S16 with the URLs in the unique malicious URL list received in S15. When the URL in the unique malicious URL list coincides with a value of a URL field of the access log, the corresponding line of the access log held by the known malicious URL excluding unit 42 is discarded. On the other hand, when the URL in the unique malicious URL list does not coincide with the value of the URL field of the access log, the corresponding line of the access log held by the known malicious URL excluding unit 42 is recorded. The known malicious URL excluding unit 42 performs the above-mentioned process for all the lines of the access log obtained by the process in S16. In this manner, the known malicious URL excluding unit 42 obtains such an access log that lines having the URLs in the unique malicious URL list have been excluded from the access log obtained by the process in S16. In other words, the known malicious URL excluding unit 42 obtains such an access log (known malicious URL excluded access log) that an access log to the URLs in the disclosed malicious URL list and the unique malicious URL list is excluded from the access log over the designated period of time sent in S13.

As a result, the known malicious URL excluding unit 42 can obtain an access log (known malicious URL excluded access log) that does not include the access log to the known malicious URLs, namely, that might include the access log to unknown malicious URLs.

An example of the known malicious URL excluded access log obtained by the above-mentioned processes is illustrated in FIG. 8. For example, the known malicious URL excluded access log is information indicating, for each IP address of the client terminal 20, URLs accessed from the client terminal 20 having the IP address.

(Creation of Minor URL List)

Next, a process for creating the minor URL list in S2 of FIG. 5 will be described in detail using FIG. 9. For example, the minor URL list creation unit 452 of the malicious URL candidate extraction device 40 obtains the known malicious URL excluded access log from the known malicious URL excluding unit 42 (S21), and counts, for each URL recorded in the access log, the number of client terminals 20 that access a site of the same URL (S22).

As a concrete example, in S22, the minor URL list creation unit 452 counts, for each URL of the known malicious URL excluded access log, the number of uniques of the IP addresses of the client terminals 20 that access the same URL. A condition for considering that the same URL is accessed may be, as illustrated in FIG. 10A, for example, such a condition that even path components of the URLs coincide, or, as illustrated in FIG. 10B, such a condition that FQDN components of the URLs coincide.

Returning to the explanation of FIG. 9, after S22 of FIG. 9, the known malicious URL excluding unit 42 extracts, from the respective URLs of the known malicious URL excluded access log, URLs in ascending order of the number of client terminals 20 that have performed the access thereto (S23). The URLs extracted in this manner are regarded as the minor URL list.

The number or ratio of URLs extracted in S23, for example, is a value set in accordance with the number of URLs that can be investigated in the malicious URL examination device 50.

The minor URL list creation unit 452 executes the above-mentioned process until, for example, the number of URLs set in advance by a user of the malicious URL candidate extraction device 40 can be extracted, whereby the minor URL list is obtained.

In this manner, the minor URL list creation unit 452 can obtain the URLs (minor URL list) of the sites that have not been revealed to be malicious in a previous examination and have a small number of times of access from the managed network.

(Creation of Unique Popular URL List)

Figure 11:
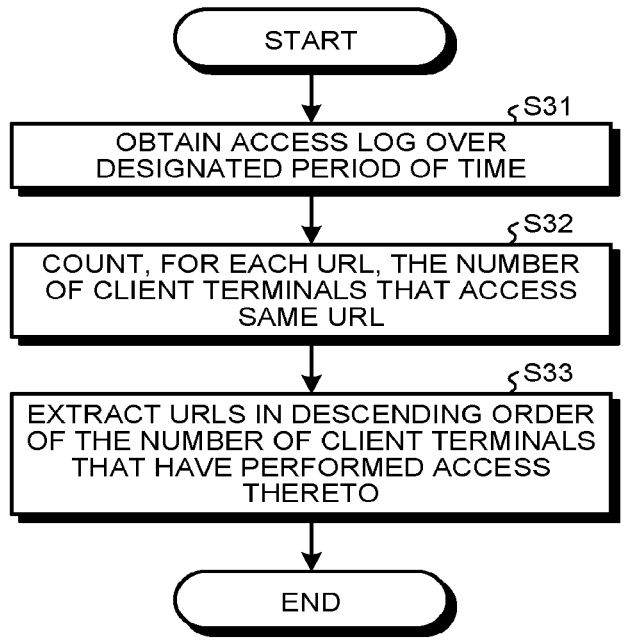
FIG. 11 is a flowchart illustrating a process for creating the unique popular URL list in S3 of FIG. 5.

Next, a process for creating the unique popular URL list in S3 of FIG. 5 will be described in detail using FIG. 11. For example, the popular URL list creation unit 44 obtains the access log over the designated period of time from the access log accumulation unit 41 (S31), and counts, for each URL recorded in the access log, the number of client terminals 20 that access a site of the same URL (S32). The designated period of time in this context may be a period of time set in advance by the popular URL list creation unit 44, or may be a period of time designated by a user every time when the malicious URL candidate extraction device 40 is operated.

For example, in S32, the popular URL list creation unit 44 counts, for each URL of the access log obtained from the access log accumulation unit 41, the number of uniques of the IP addresses of the client terminals 20 that access the same URL. A condition for considering that the same URL is accessed may be, in the same way as the above-mentioned creation of the minor URL list, such a condition that even path components of the URLs coincide, or such a condition that FQDN components of the URLs coincide.

After S32, the popular URL list creation unit 44 extracts, for each URL of the access log obtained from the access log accumulation unit 41, URLs in descending order of the number of client terminals 20 that have performed the access thereto (S33). The URLs extracted in this manner are regarded as the unique popular URL list.

The number or ratio of URLs extracted in S32, for example, is a value set in accordance with a kind of site in which daily access from the client terminal 20 in the managed network occurs.

The popular URL list creation unit 44 executes the above-mentioned process until, for example, the number of URLs set in advance by a user of the malicious URL candidate extraction device 40 can be extracted, whereby the unique popular URL list is obtained.

In this manner, the popular URL list creation unit 44 can obtain the list (unique popular URL list) of URLs of the sites having a large number of times of access from the managed network.

(Creation of Popular URL Excluded List)

Figure 12:
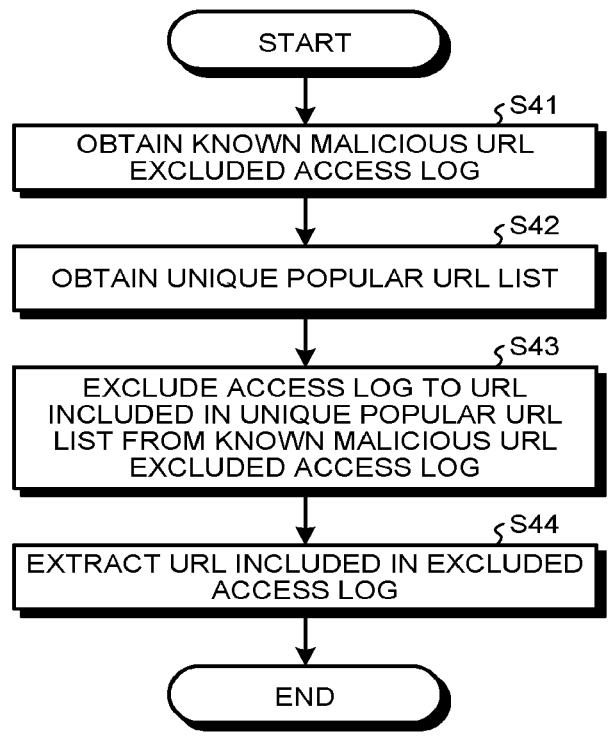
FIG. 12 is a flowchart illustrating a process for creating a popular URL excluded list in S4 of FIG. 5.

Next, a process for creating the popular URL excluded list in S4 of FIG. 5 will be described in detail using FIG. 12. For example, the popular URL list excluding unit 451 obtains the known malicious URL excluded access log from the known malicious URL excluding unit 42 (S41), and obtains the unique popular URL list from the popular URL list creation unit 44 (S42).

After that, the popular URL list excluding unit 451 excludes an access log to the URLs included in the unique popular URL list from the known malicious URL excluded access log (S43), and extracts URLs included in the excluded access log (S44).

For example, the popular URL list excluding unit 451 compares a value of a URL field in each line of the known malicious URL excluded access log with the URL in the unique popular URL list. When the URL included in the unique popular URL list coincides with the value of the URL field of the known malicious URL excluded access log, the corresponding line of the known malicious URL excluded access log held by the popular URL list excluding unit 451 is discarded. On the other hand, when the URL included in the unique popular URL list does not coincide with the value of the URL field of the known malicious URL excluded access log, the corresponding line of the known malicious URL excluded access log held by the popular URL list excluding unit 451 is recorded. The popular URL list excluding unit 451 performs the above-mentioned process for all the lines of the known malicious URL excluded access log, and obtains such an access log that lines having the URLs indicated in the unique popular URL list have been excluded from the known malicious URL excluded access log. The popular URL list excluding unit 451 then extracts the value of the URL field in each line of the access log to obtain the popular URL excluded list.

In this manner, the popular URL list excluding unit 451 can obtain a list (popular URL excluded list) of URLs of the sites that have not been revealed to be malicious in a previous examination and do not have a large number of times of daily access from the managed network.

According to the above-described malicious URL candidate extraction device 40, it is possible to output, as the malicious URL candidate list, the list of URLs, other than the known malicious URLs, of the sites having a relatively low number of times of access from the client terminal 20 in the managed network. In other words, the malicious URL candidate extraction device 40 can output, as the malicious URL candidate list, URLs which might be used for an attack on a specific organization such as a targeted attack.

Other Embodiments

In the above-mentioned embodiment, the popular URL list excluding unit 451 may create the popular URL excluded list using a popular URL list created by an external institute in addition to the unique popular URL list. That is, the popular URL list excluding unit 451 extracts, from the known malicious URL excluded access log, an access log to URLs which are not included in either the unique popular URL list or the popular URL list, thereby creating the popular URL excluded list. The popular URL list in this context, for example, is a list of URLs of sites created by research institutes, researchers, experts, and companies related to information or the like, and accessed worldwide. In other words, the popular URL list is a list of URLs of sites that are accessed daily from many users and thus reliable. As the popular URL list, for example, a disclosed popular URL list provided by the popular URL list providing server 60 illustrated in FIG. 1 is used.

In the above-mentioned embodiment, the malicious URL candidate list creation unit 45 of the malicious URL candidate extraction device 40 includes both the minor URL list creation unit 452 and the popular URL list excluding unit 451. However, the malicious URL candidate list creation unit 45 may include any of them. That is, the malicious URL candidate list output unit 453 may output any of the minor URL list and the popular URL excluded list as the malicious URL candidate list.

Figure 13:
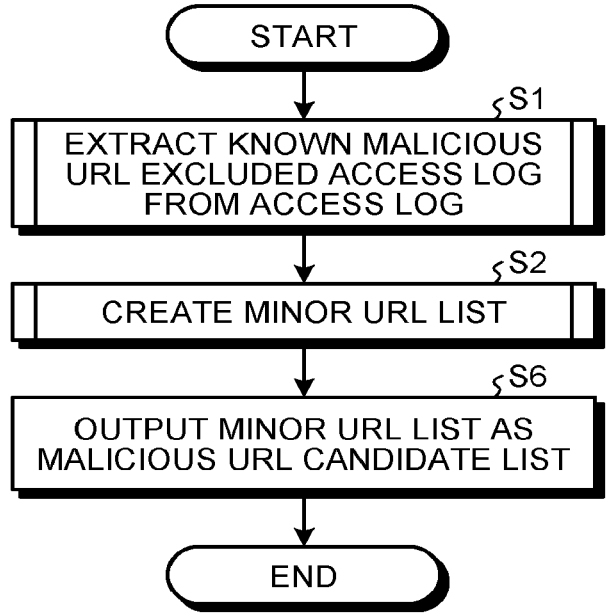
FIG. 13 is a flowchart illustrating a processing procedure of the malicious URL candidate extraction device.

For example, as illustrated in FIG. 13, after the known malicious URL excluding unit 42 of the malicious URL candidate extraction device 40 extracts the known malicious URL excluded access log from the access log accumulated in the access log accumulation unit 41 (S1), the malicious URL candidate list creation unit 45 creates the minor URL list from the known malicious URL excluded access log by means of the minor URL list creation unit 452 (S2). After that, the malicious URL candidate list output unit 453 may output the minor URL list created in S2 as the malicious URL candidate list (S6).

Figure 14:
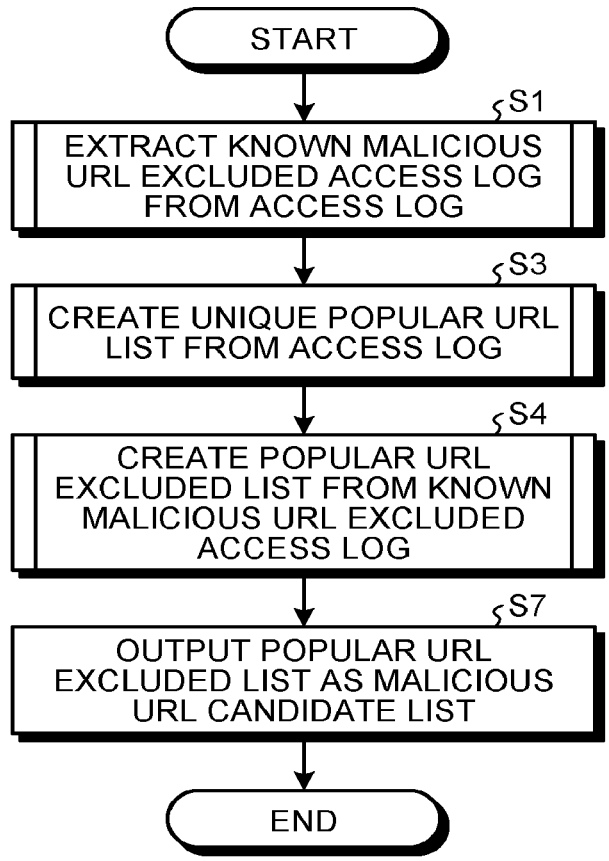
FIG. 14 is a flowchart illustrating a processing procedure of the malicious URL candidate extraction device.

For example, as illustrated in FIG. 14, after the known malicious URL excluding unit 42 of the malicious URL candidate extraction device 40 extracts the known malicious URL excluded access log from the access log accumulated in the access log accumulation unit 41 (S1), the popular URL list creation unit 44 creates the unique popular URL list from the access log accumulated in the access log accumulation unit 41 (S3). After that, the malicious URL candidate list creation unit 45 creates, by means of the popular URL list excluding unit 451, the popular URL excluded list obtained by excluding the URLs in the unique popular URL list from the URLs indicated in the known malicious URL excluded access log (S4). The malicious URL candidate extraction device 40 may then output the popular URL excluded list created in S4 as the malicious URL candidate list (S7).

In this manner as well, the malicious URL candidate extraction device 40 can output, as the malicious URL candidate list, the URLs having a relatively low number of times of access among the known malicious URL excluded access log.

(Program)

It is also possible to create such a program that the process that is executed by the malicious URL candidate extraction device 40 according to the above-mentioned embodiment is described in a language that can be executed by a computer. In this case, effects similar to those of the above-mentioned embodiment can be obtained when the computer executes the program. Furthermore, a process similar to that of the above-mentioned embodiment may be realized in such a manner that the program is recorded in a computer-readable recording medium, and the program recorded in the recording medium is read by the computer to be executed. Hereinafter, an exemplary computer that executes a website information extraction program which realizes a function similar to that of the malicious URL candidate extraction device 40 will be described.

Figure 15:
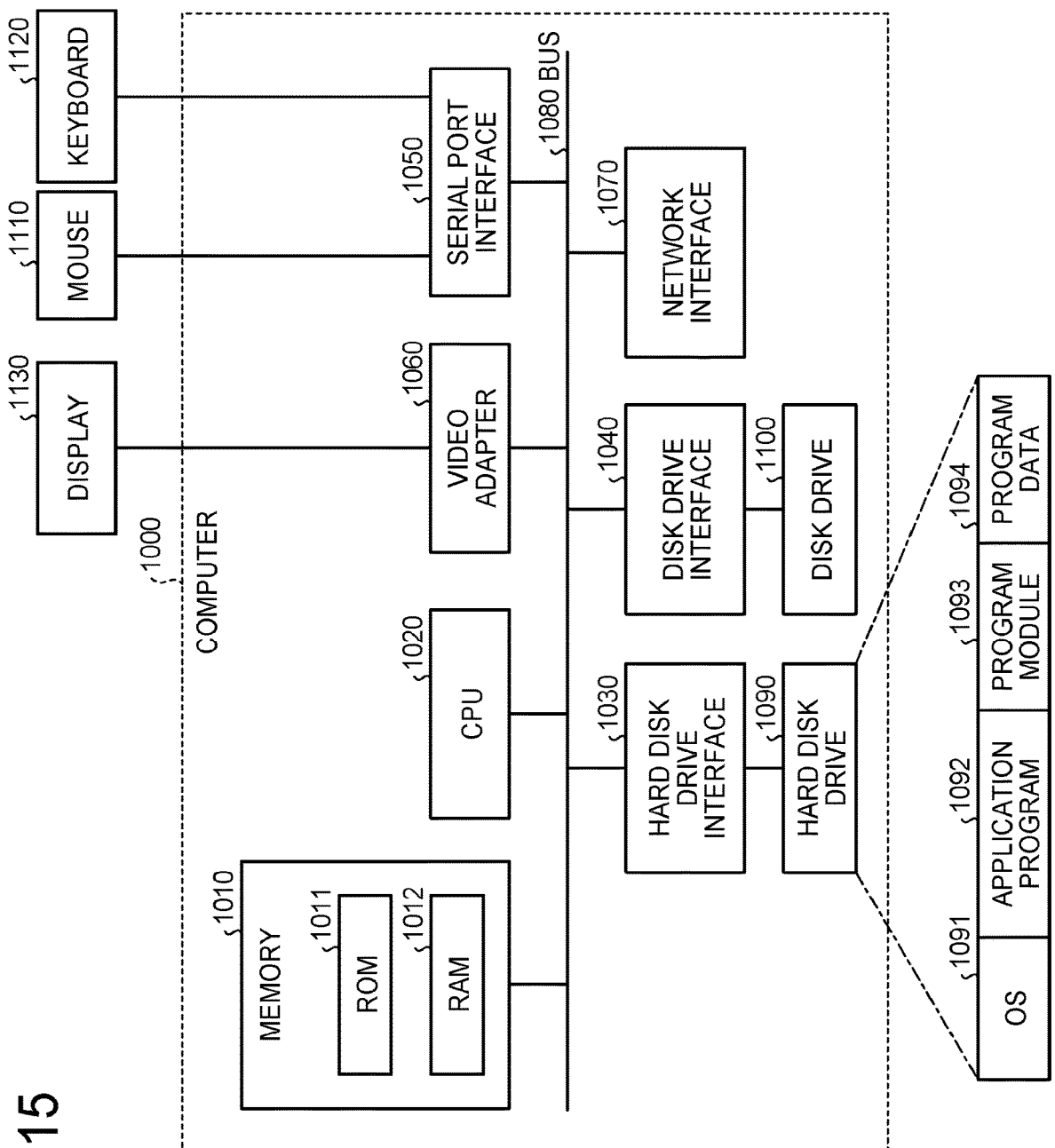
FIG. 15 is a diagram illustrating a computer that executes a website information extraction program.

FIG. 15 is a diagram illustrating a computer that executes the website information extraction program. As illustrated in FIG. 15, a computer 1000 has, for example, a memory 1010, a CPU 1020, a hard disk drive interface 1030, a disk drive interface 1040, a serial port interface 1050, a video adapter 1060, and a network interface 1070. These respective components are coupled by a bus 1080.

The memory 1010 includes a read only memory (ROM) 1011 and a random access memory (RAM) 1012. The ROM 1011 stores, for example, a boot program such as a basic input output system (BIOS). The hard disk drive interface 1030 is connected to a hard disk drive 1090. The disk drive interface 1040 is connected to a disk drive 1100. For example, a removable storage medium such as a magnetic disk and an optical disk is inserted into the disk drive 1100. To the serial port interface 1050, for example, a mouse 1110 and a keyboard 1120 are connected. To the video adapter 1060, for example, a display 1130 is connected.

As illustrated in FIG. 15, the hard disk drive 1090 stores, for example, an OS 1091, an application program 1092, a program module 1093, and program data 1094. Each of the lists described in the above-mentioned embodiment is stored, for example, in the hard disk drive 1090 or the memory 1010.

The website information extraction program is stored, for example, in the hard disk drive 1090 as a program module in which an instruction to be executed by the computer 1000 is described. Specifically, the program module, in which each of the processes to be executed by the malicious URL candidate extraction device 40 explained in the above-mentioned embodiment is described, is stored in the hard disk drive 1090.

Data that are used for an information process by the website information extraction program are stored, for example, in the hard disk drive 1090 as program data. The CPU 1020 reads the program module 1093 or the program data 1094 stored in the hard disk drive 1090 to the RAM 1012 as necessary, and each of the above-mentioned procedures is executed.

The program module 1093 or the program data 1094 related to the website information extraction program is not necessarily stored in the hard disk drive 1090, and may be, for example, stored in a removable storage medium and read by the CPU 1020 via the disk drive 1100 or the like. Alternatively, the program module 1093 or the program data 1094 related to the website information extraction program may be stored in another computer coupled via a network such as a local area network (LAN) and a wide area network (WAN), and read by the CPU 1020 via the network interface 1070.

REFERENCE SIGNS LIST

10 DISCLOSED MALICIOUS URL LIST PROVIDING SERVER

20 CLIENT TERMINAL
30 PROXY SERVER
40 MALICIOUS URL CANDIDATE EXTRACTION DEVICE
41 ACCESS LOG ACCUMULATION UNIT
42 KNOWN MALICIOUS URL EXCLUDING UNIT
43 UNIQUE MALICIOUS URL LIST ACCUMULATION UNIT
44 POPULAR URL LIST CREATION UNIT
45 MALICIOUS URL CANDIDATE LIST CREATION UNIT
50 MALICIOUS URL EXAMINATION DEVICE
60 POPULAR URL LIST PROVIDING SERVER
451 POPULAR URL LIST EXCLUDING UNIT
452 MINOR URL LIST CREATION UNIT
453 MALICIOUS URL CANDIDATE LIST OUTPUT UNIT

The invention claimed is:

1. A website information extraction device comprising: processing circuitry configured to
accumulate an access log including information of one or more websites accessed from a managed network by one or more client devices corresponding to a predetermined period of time by receiving the information of the one or more websites from a proxy server that is connected to the one or more client devices after the predetermined period of elapsed time;
extract a known malicious website excluded access log obtained by excluding, from the access log, such an access log that a known malicious website is accessed;
refer to the access log to create a popular website list indicating a predetermined number of items of information of a website in descending order of information of a website having at least a predetermined number of times of access from the managed network during a predetermined period of time, and create a popular website excluded list obtained by excluding the information of the website indicated in the popular website list from the information of the website indicated in the known malicious website excluded access log;
create a minor website list by extracting, from information of a website indicated in the known malicious website excluded access log, a predetermined number of items of information of a website in order of information of a website having a smallest number of times of access from the managed network to information of a website having a greatest number of times of access from the managed network;
create a reduced candidate website list based on a combination of the popular website excluded list and the minor website list; and
output the created reduced candidate website list to an examination device that examines whether a website is a malicious website.

2. The website information extraction device according to claim 1, the processing circuitry being further configured to accumulate, among a website previously accessed from the managed network, a unique malicious website list indicating information of a website determined to be a malicious website by a predetermined examination, and when the known malicious website excluded access log is extracted, the processing circuitry further excludes, from the access log, an access log to the website indicated in the unique malicious website list.

3. The website information extraction device according to claim 1, wherein when the processing circuitry creates the popular website excluded list, processing circuitry further excludes, from the information of the website indicated in the known malicious website excluded access log, information of a website determined to have a low possibility of being a malicious website by a preliminary investigation.

4. The website information extraction device according to claim 3, wherein the information of the website is a uniform resource locator (URL), a fully qualified domain name (FQDN), or an Internet protocol (IP) address assigned to the FQDN.

5. A system comprising:
an examination device that includes processing circuitry configured to examine whether a website is a malicious website; and
a website information extraction device that extracts a list of websites to be examined in the examination device, wherein
the website information extraction device includes:
processing circuitry configured to
accumulate an access log including information of one or more websites accessed from a managed network by one or more client devices corresponding to a predetermined period of time by receiving the information of the one or more websites from a proxy server that is connected to the one or more client devices after the predetermined period of elapsed time;
extract a known malicious website excluded access log obtained by excluding, from the access log, such an access log that a known malicious website is accessed;
refer to the access log to create a popular website list indicating a predetermined number of items of information of a website in descending order of information of a website having at least a predetermined number of times of access from the managed network during a predetermined period of time, and create a popular website excluded list obtained by excluding the information of the website indicated in the popular website list from the information of the website indicated in the known malicious website excluded access log;
create a minor website list by extracting, from information of a website indicated in the known malicious website excluded access log, a predetermined number of items of information of a website in order of information of a website having a smallest number of times of access from the managed network to information of a website having a greatest number of times of access from the managed network;
create a reduced candidate website list based on a combination of the popular website excluded list and the minor website list; and
output the created reduced candidate website list to the examination device.

6. A website information extraction method comprising the steps of:
accumulating an access log including information of one or more websites accessed from a managed network by one or more client devices corresponding to a predetermined period of time by receiving the information of the one or more websites from a proxy server that is connected to the one or more client devices after the predetermined period of elapsed time;

extracting a known malicious website excluded access log obtained by excluding, from the access log, such an access log that a known malicious website is accessed;

referring to the access log to create a popular website list indicating a predetermined number of items of information of a website in descending order of information of a website having at least a predetermined number of times from the managed network during a predetermined period of time, and create a popular website excluded list obtained by excluding the information of the website indicated in the popular website list from the information of the website indicated in the known malicious website excluded access log;

creating a minor website list by extracting, from information of a website indicated in the known malicious website excluded access log, a predetermined number of items of information of a website in order of information of a website having a smallest number of times of access from the managed network to information of a website having a greatest number of times of access from the managed network;

creating a reduced candidate website list based on a combination of the popular website excluded list and the minor website list; and outputting the created reduced candidate website list to an examination device that examines whether a website is a malicious website.

7. A non-transitory computer readable storage medium having stored therein a website information extraction program that causes a computer to execute a process comprising the steps of:

accumulating an access log including information of one or more websites accessed from a managed network by one or more client devices corresponding to a predetermined period of time by receiving the information of the one or more websites from a proxy server that is connected to the one or more client devices after the predetermined period of elapsed time;

extracting a known malicious website excluded access log obtained by excluding, from the access log, such an access log that a known malicious website is accessed;

referring to the access log to create a popular website list indicating a predetermined number of items of information of a website in descending order of information of a website having at least a predetermined number of times from the managed network during a predetermined period of time, and create a popular website excluded list obtained by excluding the information of the website indicated in the popular website list from the information of the website indicated in the known malicious website excluded access log;

creating a minor website list by extracting, from information of a website indicated in the known malicious website excluded access log, a predetermined number of items of information of a website in order of information of a website having a smallest number of times of access from the managed network to information of a website having a greatest number of times of access from the managed network;

creating a reduced candidate website list based on a combination of the popular website excluded list and the minor website list; and outputting the created reduced candidate website list to an examination device that examines whether a website is a malicious website.

* * * * *